(12) United States Patent
Manber et al.

(10) Patent No.: US 8,473,349 B1
(45) Date of Patent: Jun. 25, 2013

(54) AD SERVER AND SYNDICATION SYSTEM

(75) Inventors: Udi Manber, Palo Alto, CA (US); Jonathan Leblang, Menlo Park, CA (US)

(73) Assignee: A9.com, Inc., Palo Alto, CA (US)

( * ) Notice: Subject to any disclaimer, the term of this patent is extended or adjusted under 35 U.S.C. 154(b) by 3354 days.

(21) Appl. No.: 10/851,776

(22) Filed: May 21, 2004

(51) Int. Cl.
*G06Q 30/00* (2012.01)

(52) U.S. Cl.
USPC .............. 705/14.49; 705/14.48; 707/999.001

(58) Field of Classification Search
USPC ..................................... 705/14, 27
See application file for complete search history.

(56) References Cited

U.S. PATENT DOCUMENTS

| | | | |
|---|---|---|---|
| 5,991,740 A | | 11/1999 | Messer |
| 6,230,199 B1 * | | 5/2001 | Revashetti et al. ............ 709/224 |
| 6,282,548 B1 | | 8/2001 | Burner et al. |
| 6,460,036 B1 | | 10/2002 | Herz |
| 6,778,975 B1 | | 8/2004 | Anick et al. |
| 2001/0037415 A1 | | 11/2001 | Freishtat et al. |
| 2001/0042064 A1 | | 11/2001 | Davis et al. |
| 2001/0044757 A1 * | | 11/2001 | Robb et al. ...................... 705/27 |
| 2002/0087660 A1 | | 7/2002 | Martin et al. |
| 2002/0103789 A1 | | 8/2002 | Turnbull et al. |
| 2002/0169760 A1 | | 11/2002 | Cheung et al. |
| 2003/0088525 A1 | | 5/2003 | Velez et al. |
| 2003/0149938 A1 | | 8/2003 | McElfresh et al. |
| 2004/0015397 A1 * | | 1/2004 | Barry et al. ..................... 705/14 |
| 2004/0059708 A1 * | | 3/2004 | Dean et al. ........................ 707/1 |
| 2004/0093327 A1 * | | 5/2004 | Anderson et al. ................ 707/3 |
| 2005/0071224 A1 * | | 3/2005 | Fikes et al. ..................... 705/14 |

FOREIGN PATENT DOCUMENTS

WO  WO 03/010689 A1  2/2003

* cited by examiner

*Primary Examiner* — John Weiss
*Assistant Examiner* — Darnell Pouncil
(74) *Attorney, Agent, or Firm* — Knobbe Martens Olson & Bear LLP (57) ABSTRACT

An ad server and syndication system provides a browsable hierarchy of categories, such as topical ad categories and/or product categories, with which specific ads may be explicitly associated. A first user interface provides functionality for advertisers to browse the hierarchy, and to post ads in association with specific ad categories. A second user interface provides functionality for web site operators wishing to host ads on their web sites to select or exclude specific categories of ads to host. In one embodiment, a web site operator that sells a particular category of products can locate that product category within the hierarchy, and then select from a corresponding list of product-related-services that may be advertised on web pages associated with such products.

15 Claims, 6 Drawing Sheets

FIG. 1

Create your ad

Selected product or product category
with which to associate your ad:   DVD Players

In: Electronics > Video equipment

Select an ad category  [DVD Rentals / DVD Sales / A-V Installation / A-V Repair ...]   Note: your ad must fall within the ad category you select Enter the text of
your ad (100 Chars. max):   DVD Rentals By Mail
Rent all the DVDs you want for just $20/month
WWW.DVDRentals.com Enter your bid for this ad:   $ [      ]   view bidding rules Start Date: 12/13/03    End Date: 12/22/03

Do you wish to limit the display of this ad to users in one or more specific geographic regions?

☐ yes (you can select your regions on the next page)
☑ no

[Submit]

AD SERVER AND SYNDICATION SYSTEM

BACKGROUND OF THE INVENTION

1. Field of the Invention

The present invention relates to ad servers and ad syndication systems used to display advertisements on web pages.

2. Description of the Related Art

Various types of ad server systems exist for displaying targeted advertisements on web pages. One type of system allows business entities (advertisers) to associate their respective ads with specific keywords, which may include phrases. When a user submits a search query to an Internet search engine, the ad or ads associated with the keyword or keywords entered by the user are displayed on the resulting search results page—typically under a heading such as "sponsored links" or "sponsored results." The display position of each such ad relative to other ads, and the amount paid by the corresponding advertiser if the ad is clicked on by a user, is typically dictated by a keyword bid amount specified by the advertiser. Typically, the ads of each advertiser are displayed on a variety of different independent web sites through a process known generally as syndication.

Another type of ad server and syndication system operates by selecting ads to display on relatively static web pages by performing content-based analyses of such pages. For example, Google's AdSense program allows web site operators to configure selected pages of their respective web sites to display or "host" ads served by a remote ad server. To select appropriate ads to display on a given page, a crawler program analyzes the textual content of the page, and attempts to match the page's content to relevant ads.

A significant problem with existing ad server and syndication systems is that they do not provide an effective mechanism for allowing web site operators to control the types of ads displayed on their respective web sites. As a result, some web site operators are deterred from displaying or "hosting" syndicated ads on their sites. For instance, online merchants are commonly unwilling to host sponsored link type ads due to the risk that these ads will lure away potential customers. Although some systems permit creation of a URL filter to block ads for certain businesses, this approach does not inhibit the display of ads for web sites and businesses that are unknown to the operator of the ad-hosting web site.

SUMMARY OF THE INVENTION

The present invention comprises an ad server and syndication system that provides a browsable hierarchy of categories, such as product categories or more general topical ad categories, with which specific ads may be explicitly associated. A first user interface provides functionality for advertisers to browse the hierarchy, and to post ads in association with specific ad categories. A second user interface provides functionality for web site operators wishing to host ads on their web sites to select or exclude specific categories of ads to host. An ad server uses the explicit associations between the ads and ad categories to select ads to display on web sites in accordance with the selections made by the operators of such sites.

A first embodiment of the invention is a system that is particularly well suited for allowing online sellers of products to host ads that are related to such products, without hosting ads for the products themselves. The system includes a web-based ad generation interface through which an advertiser/service provider can browse or search a product hierarchy to locate a particular product, or product category, with which to associate a new ad, such as an ad for a product-related service. Upon locating a desired product or product category, the service provider may also optionally be permitted or required to select from a corresponding list of permitted service categories or other ad categories. For instance, if the service provider chooses the product category "digital cameras," the service provider may then be prompted to select one of the following permissible service/ad categories: "online photo print services," "photography classes," "digital photo album services," or "digital camera repair." A given ad may thus be associated with or linked to both (a) a product descriptor identifying product(s) to which the advertised service is applicable, and (b) an associated ad category that specifies the type of service being offered. The system may also provide an option for the advertiser to purchase or bid on the selected ad category.

The system in this first embodiment also preferably includes a web-based ad hosting interface through which a web site operator wishing to host ads on its web site can request ads of a particular type. This interface preferably allows the web site operator to select a desired product or product category from the product hierarchy, and then select one or more corresponding categories of ads to host. For example, an online seller of digital cameras may initially select the "digital cameras" category, and then select any one or more of the above-mentioned ad/service categories. Ads falling outside the ad/service categories selected by the merchant are excluded from display on the web site. The web site operator may also be permitted to select specific ad/service categories to exclude (e.g., "display all ads associated with digital cameras except ads for online photo print services").

In a second embodiment, a hierarchy of topical advertisement categories is provided. The topical categories may include product or product-related-service categories such as "DVD players" and "DVD player repair," and may also include non-product-related categories such as "tax preparation" and "IT consulting." Advertisers may browse this hierarchy to select specific advertisement categories or topics with which to associate their ads, and may purchase or bid on specific categories/topics. Web site operators wishing to host ads may browse and select from this same hierarchy of topical categories to control the types of ads displayed on their respective web sites.

Neither this summary nor the following detailed description purports to define the invention. The invention is defined by the claims.

DETAILED DESCRIPTION OF THE PREFERRED EMBODIMENTS

Two specific embodiments of the invention will now be described with reference to the drawings. The first embodiment, which is depicted in FIGS. 1-5 and described in subsection I below, uses a product hierarchy to categorize product-related ads, such as ads for product-related services. This first embodiment is particularly useful for allowing online merchants of products to limit ads hosted on their respective web sites to ads for product-related services associated with such products. The second embodiment, which is depicted in FIG. 6 and is described in subsection II, uses a browsable hierarchy of topical advertising categories to categorize and control the display of ads. These embodiments are provided in order to illustrate, and not limit, the invention. The scope of the invention is defined by the claims.

I. Product Hierarchy Embodiment

Figure 1:
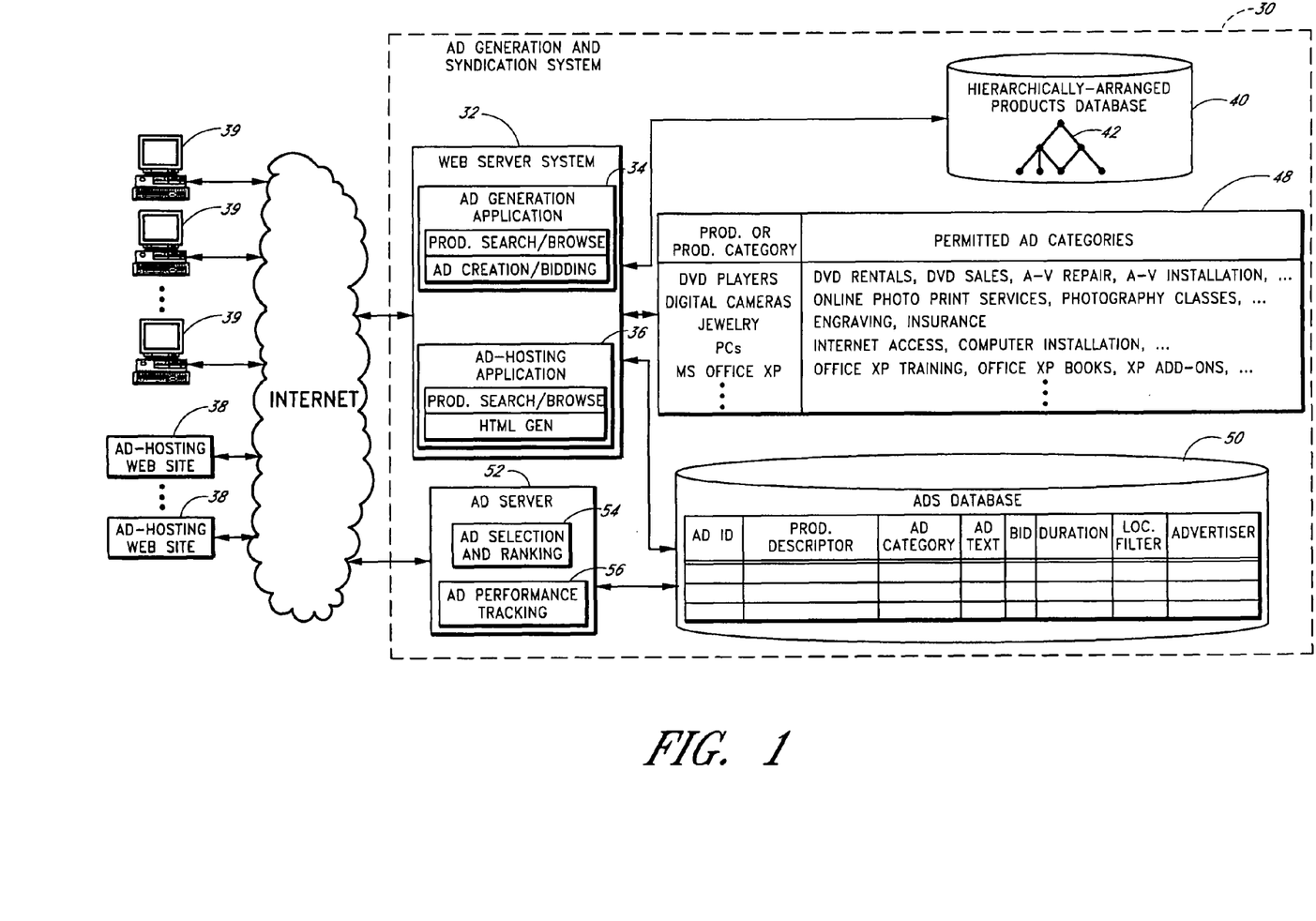
FIG. 1 illustrates an ad generation and syndication system according to one embodiment of the invention.

FIG. 1 illustrates an advertisement generation and syndication system 30 according to a first embodiment of the invention. As illustrated, the system includes a web server system 32 that hosts two web-based applications: an ad generation application 34 and an ad hosting application 36. The ad generation application 34 provides a user interface and associated functionality for advertiser-users to create "sponsored link" type advertisements, and to associate or "link" these advertisements with specific products and/or product categories for display purposes. The ads preferably include, and may be limited to, ads for product-related services (installation, repair, training, engraving, etc.) that are offered to owners or consumers of corresponding products. As discussed below, the user interface of the ad generation application 34 preferably specifies the types of product-related services that may be advertised for a given product or product category.

The ad hosting application 36 provides a user interface and associated functionality for web site operators, such as but not limited to online merchants, to configure their respective web sites 38 to display or "host" the ads on selected web pages. Typically, these "ad-hosting" web sites 38 include or are limited to product-oriented web sites that display information about specific products. As discussed below, the ad hosting application 36 advantageously allows a web site operator to configure selected web pages to display ads that pertain specifically to the products displayed on such web pages, so that the ads are highly relevant to the content of these pages. For instance, web pages that display cameras can be configured to display ads that have been linked to the product category "cameras," or possibly to a particular brand or model of camera.

As depicted by the user computers 39 in FIG. 1, users may access the system 30 over the Internet using an ordinary web browser. In general, three different types of users make use of the system 30: advertisers, operators of the ad-hosting web sites 38, and users of these ad-hosting web sites 38. The advertisers, who are typically or exclusively providers of product-related services, access the system via the ad generation application 34 for purposes of generating ads that are to be displayed within pages of the ad-hosting web sites 38. The operators of the ad-hosting web sites 36 access the system 30 via the ad hosting application 36 for purposes of setting up selected web pages to display specific types of ads. The users of the ad-hosting web sites 38 do not directly interact with the system 30, but may view and click on ads served by the system. As is conventional, each advertiser may be charged for placement of its ads on web pages on a "pay-per-click" basis, meaning that the advertiser need not pay for mere ad display events or "impressions."

An important feature of the system is that it allows an online merchant of products to limit the types of ads displayed on its web site 38 to ads that do not compete with the web site 38. In one implementation, this objective is accomplished by permitting the creation of ads for product-related services only, so that no ads for the products themselves will be displayed on the online merchant's site 38. Enforcement of this rule may be accomplished by performing an automated and/or manual analysis of the ads created via the ad generation application 34 before these ads are made available for display. Advertisers may also be required to accept the terms of an online agreement that prohibits the generation of ads for products.

In a second implementation, which is depicted by the drawings (and especially FIG. 2), the objective of serving only non-competing ads is additionally or alternatively accomplished by allowing the online merchant/ad hosting entity to explicitly designate the category or categories of product-related ads to be displayed. For example, an online merchant that sells digital cameras can explicitly request ads falling within the camera-related ad categories "digital print ordering services," "digital photography classes," and "digital photography books," such that ads falling within other camera-related ad categories are excluded. As illustrated by this example, advertisements for specific types of products (such as books) may optionally be allowed in this second implementation, since the online merchant can exclude these advertisements if desired. Another advantage of this second implementation is that it allows the operators of the ad-hosting web sites 38 to indicate, with greater specificity, the types of ads they wish to host. In a hybrid of these two implementations, all of the ads are for product-related services, and the operators of the ad-hosting web sites can specify the types of product-related services they wish to advertise on their respective sites.

As illustrated in FIG. 1, the system 30 includes a hierarchically-arranged products database 40 that contains information about the various products and product categories with which ads may be explicitly linked. Products are arranged within this database 40 within a product hierarchy 42 in which each node generally represents a particular product or product category. The set of products to which a given node (product or product category) corresponds may be specified by a product descriptor, which may, for example, include associated product name(s) and model number(s).

Figure 2:
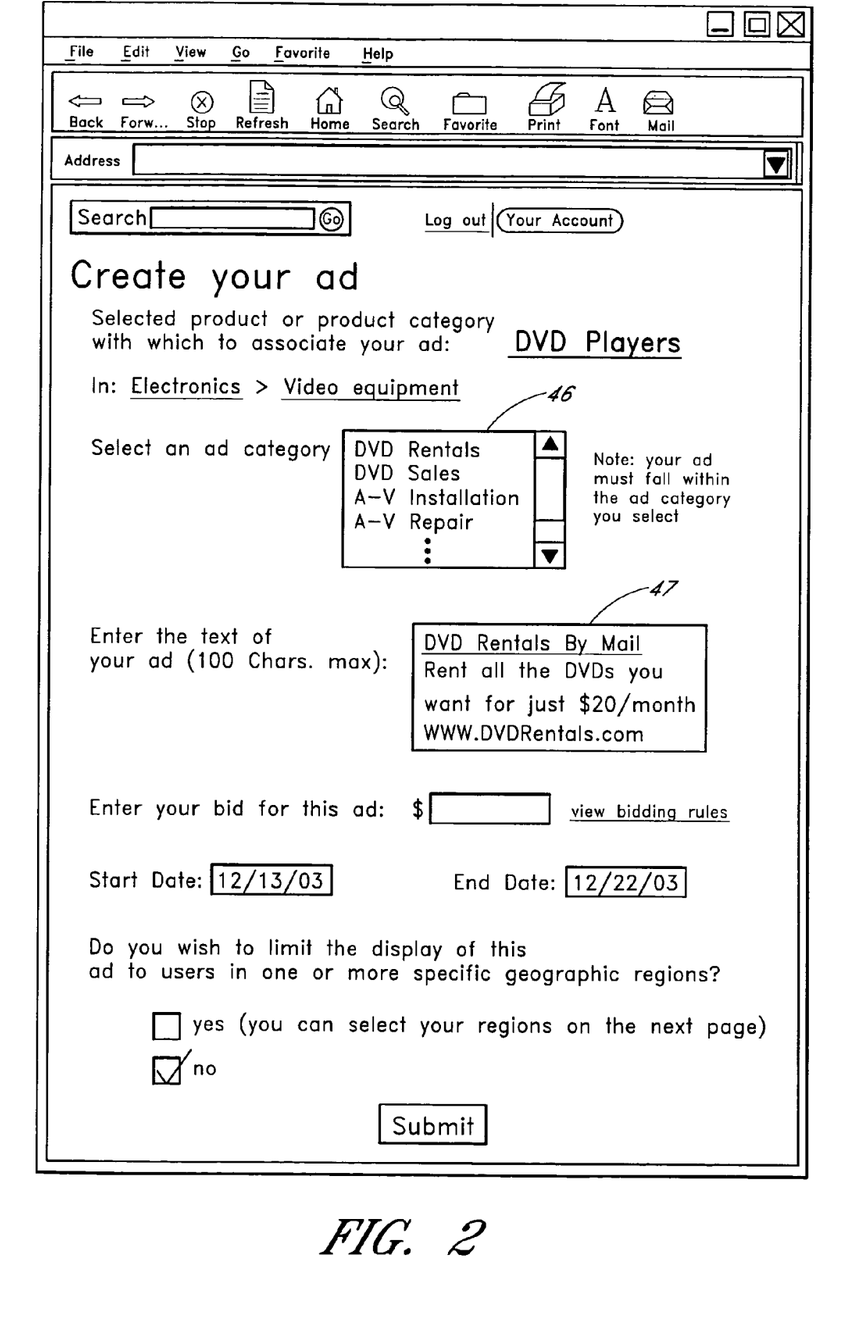
FIG. 2 illustrates an example web page of a user interface for creating ads, and for linking these ads to specific products/product categories and ad categories.

As depicted in FIG. 2 (discussed below), users of the ad generation application 34 can browse the product hierarchy 42 in order to select specific products and/or product categories with which to link their respective ads. For example, an advertiser can link an add for a product-related service to a particular product, or group of products, to which the product-related service is applicable. Web site operators wishing to host ads can also preferably browse the same hierarchy of products 42 for purposes of selecting product-related advertisements to host. To provide a high degree of flexibility to both the advertisers and the operators of the ad-hosting web sites 38, a product hierarchy 42 containing many millions of different products and many thousands of different product categories is preferably used. Multiple levels of product categories may be provided within the hierarchy 42 (e.g., electronics>portable audio>headphones).

Although a hierarchy of products is used in the illustrated embodiment of FIGS. 1-5, the invention is not so limited. For example, a hierarchy may alternatively be used that includes or consists of advertising categories or topics, such as "tax preparation," "graphic design," and "web site hosting," with which the ads may be associated. An embodiment in which a hierarchy of advertising topics or subjects is used is depicted in FIG. 6 and is discussed in subsection II below.

Although a single product hierarchy 42 is depicted in FIG. 1, two or more separate product hierarchies may be used. For instance, one hierarchy may be provided in which products are arranged solely by type, and another may be provided in which some or all of the same products are arranged by brand. As depicted by the example ad titled "Repair your in DVD player" in FIG. 3, the ability to link ads to specific product brands may be particularly desirable to a service center that is authorized to service specific brands of products.

FIG. 2 illustrates an example web page of the ad generation application 34. As illustrated, the user interface of the ad generation application 34 preferably includes a search box that may be used to locate specific products and/or product categories within the database 40. A conventional "browse tree" interface is also preferably provided for this purpose. In the example shown in FIG. 2, the advertiser-user has browsed to a web page associated with the product category "DVD Players," which falls within the product hierarchy 42 under "Electronics>Video Equipment." The permissible ad categories associated with the DVD Players category are displayed within a selection box 46. Although the user must select one of these ad categories in the embodiment shown in FIG. 2, the ability to designate an ad category may be omitted, or may be made optional. The page also includes a text box 47 for entering the text of the desired ad, including the URL of the advertised web site.

In the example web page shown in FIG. 2, the advertiser-user can also enter a bid amount, which may be the amount the advertiser is willing to pay for each ad click-through event. The bid amount may also affect (1) the frequency with which the ad is displayed on pages of the ad-hosting sites 38, and (2) the display position of the ad relative to other ads. Although bidding is used in this example, other types of payment schemes, including fixed pricing, may additionally or alternatively be used. The web page also provides an option for the advertiser-user to specify a start date and an end date for the ad, and to select an option to limit the display of the ad to users in one or more specific geographic regions (cities, or counties, zip codes, etc.). The advertiser may also be permitted to specify a monetary cap (not shown) that, when reached, causes the system 30 to stop serving the ad.

Once the form shown in FIG. 2 has been completed, the user can select a "submit" button to submit the ad to the system 30. The ad will then be stored in association with both (1) the selected product or product category ("DVD Players" in this example), and (2) the designated ad category. Ad discussed below, these two types of associations are ultimately used to select web pages on which to display the ad.

Referring again to FIG. 1, the system 30 preferably includes a table 48 or other data structure that specifies the permitted ad categories for at least some of the products and product categories in the hierarchy 42. This table 48 is used by the ad generation application 34 to display the "permitted ad category" lists of the type shown in FIG. 2 (box 46). In some embodiments, the ability to link ads to specific products and/or product categories may be limited to specific levels of the product hierarchy 42. For instance, the ad generation application 34 may limit the linking of ads to one of the following: (a) specific product categories only, (b) specific types of product categories, such as leaf categories (categories with no sub-categories), or (c) specific products only.

As further depicted in FIG. 1, the system 30 also includes an advertisements database 50 that contains information about the currently-valid ads created via the ad generation application 34. As illustrated, the information stored for each ad may include the following: (a) a unique ad identifier, (b) a product descriptor, or product descriptor ID, that describes or identifies the product or product category with which the ad is linked, (c) the associated ad category (e.g., repair, training, etc.) specified by the advertiser, (d) the text of the ad, including the target URL, (e) the associated bid, (f) the ad's start and stop dates, (g) an optional location filter indicating the geographic regions in which the ad may be displayed, and (h) an identifier of the advertiser. The advertisements database 50 may also maintain a count of the number of times each ad has been served (referred to as the number of "impressions"), and a count of the number of times each ad has been selected by a user (referred to as the "click-through" count).

Ads stored in the advertisements database 50 are selected by an ad server 52 in response to page viewing events by users of the ad-hosting web sites 38. For example, when a user requests a product detail page that has been configured to display ads, the user's browser will send a request to the ad server 52 for the associated ads. The ad server 52 will respond to this request by selecting and returning one or more ads that are associated with the product displayed on the product detail page. For purposes of selecting the ads to display in conjunction with a given product, the ad server 52 may select from a group of ads consisting of (a) all ads that are linked to the product itself, and (b) all ads that are linked to a product category that includes this product. As shown in FIG. 1, the ad server 52 in the illustrated embodiment includes an "ad selection and ranking" component 54 that dynamically selects ads to display on web pages. In addition, the ad server 52 includes an "ad performance tracking" component 56 that maintains an impressions count and a click-through count for each ad. The task of monitoring ad performance may alternatively be performed by a separate server system.

Figure 3:
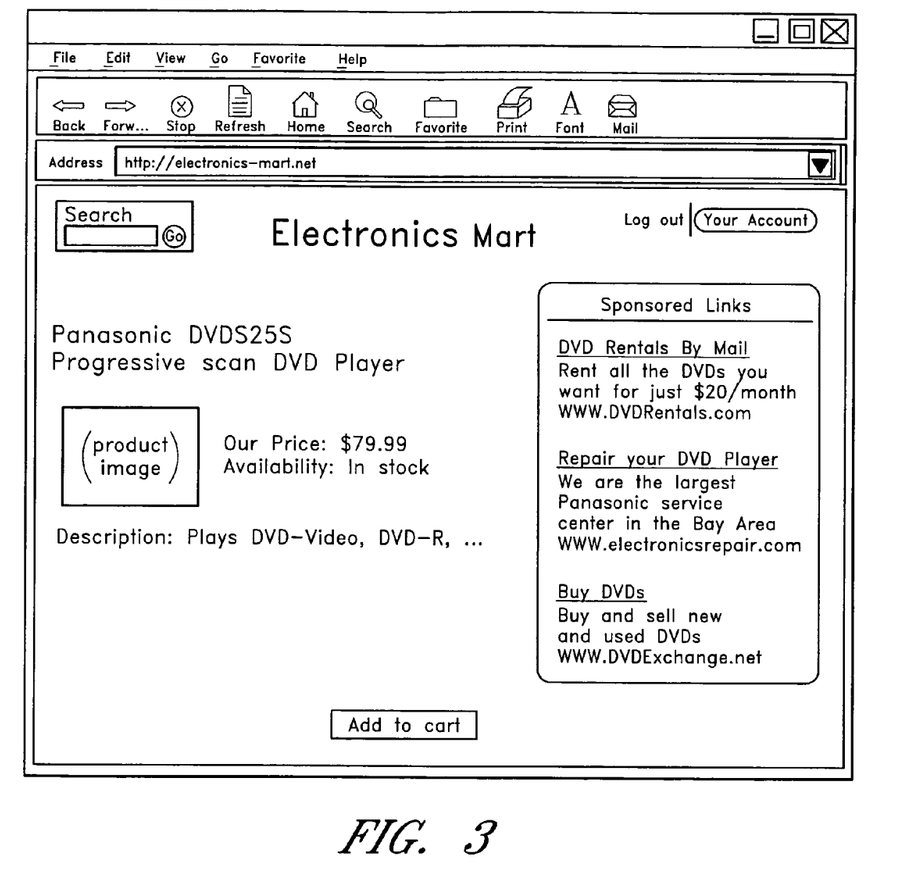
FIG. 3 an example product detail page that displays ads for associated product-related services.

FIG. 3 illustrates how the ads served by the ad server 52 may be displayed within a product detail page of an ad-hosting online merchant. In this example, the merchant has configured the product detail page for a particular DVD player to display ads falling in three non-competing ad categories: DVD rentals, audio-video repair, and DVD sales. The three ads that have been selected for display are displayed in a "sponsored links" box 58. In selecting the specific ads to display on the page, the ad server 52 may take into consideration the click-through rate and the bid associated with each ad. Preference may also be given to ads that are directly linked to the product itself over ads merely linked to a product category in which the product falls.

In addition to displaying ads on product detail pages (i.e., web pages that are primarily directed to a specific product), the system 30 may also be used to display ads on other types of product-oriented web pages. For example, an online merchant may set up a browse node page for a particular product category to display ads that are linked to that category. Ads may also be displayed on product-search results pages and other types of pages that display information about specific products. The online merchant need not arrange its products database using the same hierarchy 42 of product categories used within the advertisement generation and syndication system 30.

Figure 4:
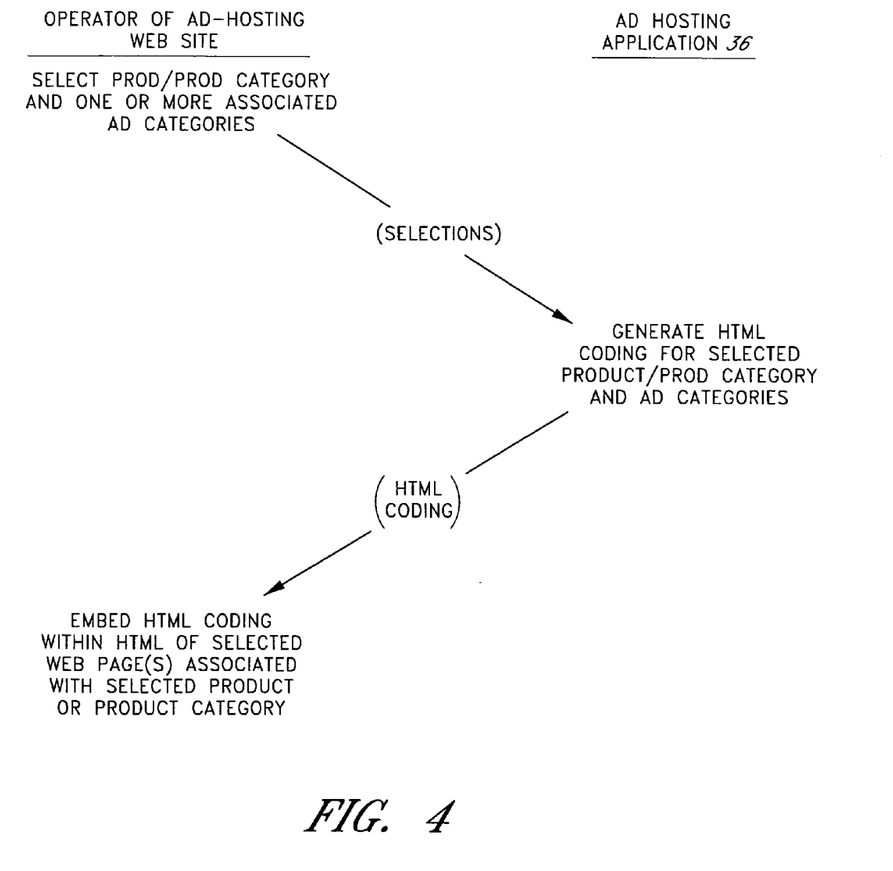
FIG. 4 illustrates one type of process that may be used to configure product-related web pages to display ads of desired type.

FIG. 4 illustrates one example of a process by which an operator of an ad-hosting web site 38 may initiate the process of hosting ads on one or more selected web pages. Initially, the web site operator browses the hierarchically-arranged products database 40 (via a product browse tree and/or a product search engine) to identify a specific product or product category of interest. The web site operator may also select from a listing of the ad categories associated with the selected product or product category so as to inhibit the display of competing ads. For instance, using the hypothetical ad categories in FIG. 1, if the ad-hosting web site 38 sells digital cameras and also provides online photo print services, the web site operator may choose the product category "digital cameras" but exclude the associated ad category "online photo print services." The web site operator may specify types of ads to host by either selecting ad categories to include or selecting ad categories to exclude.

As a web site operator browses the product hierarchy 42, the user interface may provide an option to view some or all of the currently-posted advertisements associated with each node of the hierarchy (i.e., each product or product category) and each ad category of that node. Thus, before selecting a particular category of ads to host, the web site operator can obtain a general sense of the types of ads that will be displayed. The user interface may also provide an option for the web site operator to exclude specific ads or advertisers within a selected product/product category or associated ad category. An option may also be provided for the web site operator to subscribe to a notification service that notifies web site operators when new ads are added to the ad categories they are currently hosting.

The web site operator's selections are communicated to the ad hosting application 36, which preferably uses this information to generate the associated HTML "ad request" coding to be added to selected web pages of the ad-hosting web site. This HTML coding preferably includes identifiers of the selected product/product category and ad categories, so that the associated browser requests to the ad server 52 will include this information. This information may alternatively be stored in a look-up table accessible to the ad server 52, such that more generic ad request coding may be used. The web site operator then inserts the HTML coding within one or more web pages associated with the selected product or product category. The web site operator may repeat the process shown in FIG. 4 for each product or product category of interest, such that different types of non-competing ads are displayed on different web pages of the online merchant's site.

As an alternative to the process shown in FIG. 4, the system 30 may include a web crawler/analyzer that analyzes some or all of the pages of the ad-hosting web site, and selects the products/product categories to which such pages correspond. For example, a web crawler/analyzer may analyze each web page (or at least those selected to host ads), and attempt to match the page to the lowest-level product hierarchy node to which the web page corresponds. The results of this analysis may be stored in a table that maps specific URLs of the ad-hosting web site 38 to corresponding products and/or product categories. This table may in-turn be accessed by the ad server 52 at page-load time to quickly identify the product or product category to which the requested web page corresponds, so that ads associated with that product or product category may be selected for display. With this approach, the HTML ad-request code added to the relevant web pages need not identify the products or product categories.

By way of example, the page analysis algorithms disclosed in U.S. patent application Ser. No. 09/528,138, filed Mar. 17, 2000, could be used to crawl and analyze a merchant's web site to locate, and build an index of, the pages from which products can be selected for purchase (added to a shopping cart, purchased immediately, etc.). This index may then be used by the ad server to select ads to display on these web pages. The disclosure in the '138 application of algorithms for analyzing web pages to identify product offerings is hereby incorporated by reference.

Rather than using a crawler, the task of analyzing page content to select appropriate ads to display may be performed in real time as the pages are requested. In addition, a database of pre-crawled page content may be used to identify the types of ads to display.

The ad-hosting online merchant may also set up a product search page such that search queries submitted by users of the merchant's site 38 are passed to the ad server 52 for purposes of selecting ads to display on search results pages. With this approach, the ad server 52 may initially attempt to match the user's search query to a particular product or product category within the hierarchy 42, and then select ads that are linked to this product or product category. Any such ads falling outside the ad categories requested by the online merchant may then be filtered out. The ad server 52 may additionally or alternatively select one or more ads based on identities of products (search results) that appear on the search results page.

Figure 5:
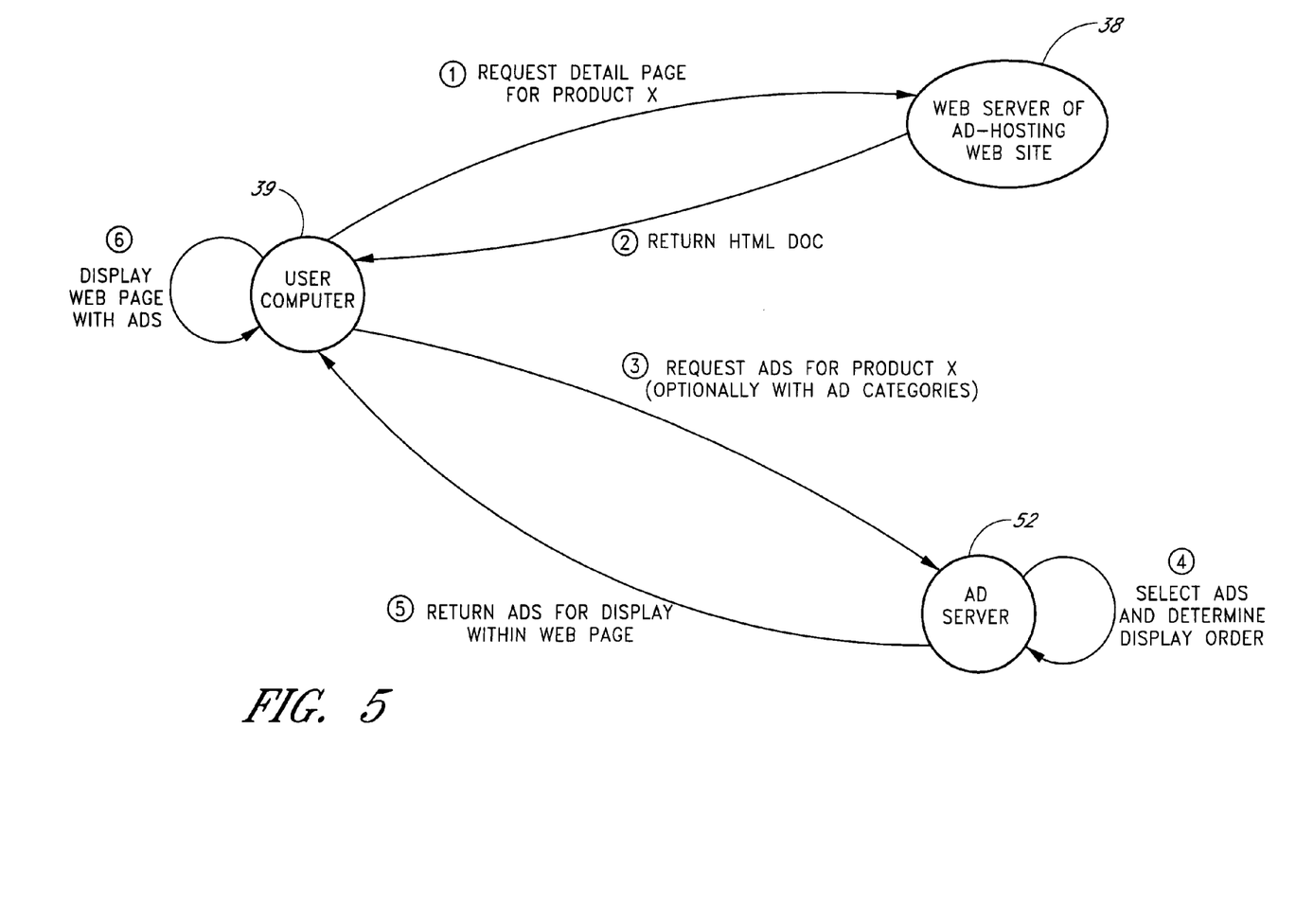
FIG. 5 illustrates a sequence of events that occur when a user/browser requests a web page that hosts ads in the system of FIG. 1.
Figure 6:
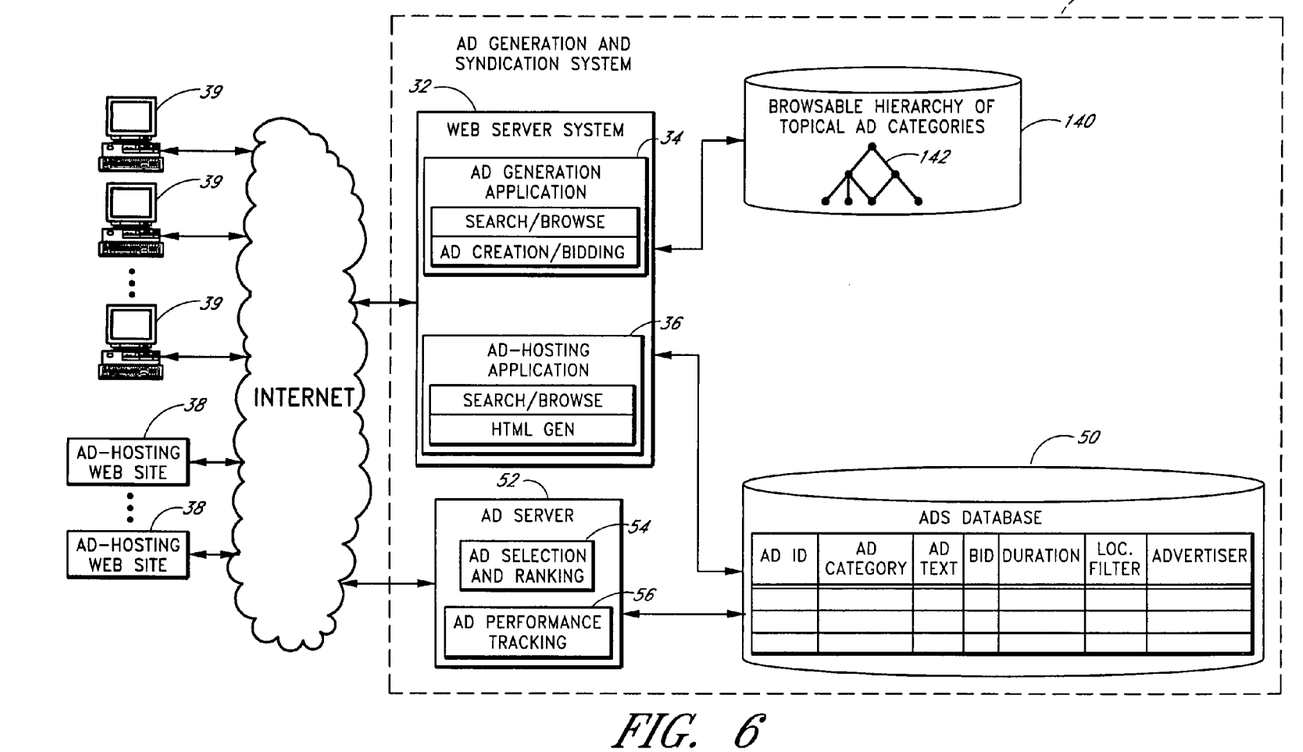
FIG. 6 illustrates an embodiment that uses a hierarchical browse structure of topical advertisement categories.

FIG. 5 illustrates the sequence of interactions that may occur when a user computer/browser 39 requests a web page of an ad-hosting web site 38. It is assumed in this example that the web page is a product detail page for product X, and that the HTML ad-request sequence added to this page identifies this product. In event 1, the user computer 39 requests the product X detail page from the web server of the ad-hosting web site 38. In event 2, the ad-hosting web site 38 responds by returning an HTML document that includes the HTML ad-request code. In event 3, the ad-request code causes the user computer/browser 39 to send a request to the ad server 52 for ads associated with product X. As illustrated, this request may also optionally specify one or more associated ad categories pre-specified by the operator of the ad-hosting web site, although the ad server may alternatively obtain this information from a look-up table.

In event 4, the ad server 52 responds to the request for ads by selecting a set of ads to display on the page, and by selecting an associated display order in which to present the ads. This process may involve some or all of the following steps: (a) identify all ads that are linked to product X, or to a product category within in which product X falls within the product hierarchy 42, (b) filter out any ads that either do not fall within an ad category specified by the ad-hosting entity or are not applicable to the geographic location of the user; (c) score each remaining candidate ad based on its click-through rate, bid amount, and possibly other criteria, and (d) select the top N candidate ads, where N is the maximum number of ads that may be displayed on the page. In events 5 and 6, the ad server 52 returns these ads to the user computer 39, and the browser displays these ads within the requested web page.

Another method that may be used to select ads to display is to use the product purchase histories and/or product viewing histories of the target users as a basis for selecting ads. For example, if a user purchases or views one or more products falling within a particular product category, ads linked to that product category in the hierarchy may thereafter be selected for display to the user. This may be accomplished, for example, by configuring the merchant (ad-hosting) web site 38 to identify the product category or categories of most interest to each user (based on user purchase histories, product viewing histories, etc.), and to dynamically encode such preference information within the ad-request coding of pages served to each such user. Thus, when a user retrieves a web page that is configured to display one or more ads, the browser will request from the ad server 52 ads falling within one or more particular product categories previously determined to be of interest to the user. With this approach, as a user browses the merchant web site, the user may, for example, see ads for product-related services associated with products the user previously purchased.

Although the system 30 is preferably used to syndicate ads to web sites of various business entities, features of the system may also be embodied in a system in which the ads are hosted solely by a particular web site. For instance, an online merchant could set up its own implementation of the system 30 for the sole purpose of displaying ads on its own web site.

II. Embodiment Using Hierarchy of Topical Ad Categories

FIG. 6 illustrates a second embodiment in which the product hierarchy 42 of FIG. 1 is replaced with a browsable hierarchy of topical advertisement categories 142, which may but need not include product categories. Each advertisement category may be in the form of a category descriptor, such as a keyword, a keyword phrase, or a list of keywords and/or keyword phases, that describes a particular advertising topic or subject. The advertisement categories may describe, for example, types of services that may be advertised (e.g., tax preparation, web site hosting, computer repair, etc.), types of products that may be advertised (laptop computers, apparel, magazine subscriptions, etc.), and/or types of online businesses that may be advertised (online brokerages, social networking sites, online auction sites, etc.). Advertisers may browse this hierarchy 142 via the web-based ad generation application 34 to locate specific advertisement categories with which to associate their ads. Web site operators wishing to host ads may browse the hierarchy 142 via the ad-hosting application 36 to select specific categories of ads to host.

Advertisers may be required to associate their ads with advertisement categories falling at the lowest level or levels of the hierarchy 142 (i.e., those categories that are generally the most specific). Upon locating a desired advertisement category, an advertiser may be permitted to purchase or bid on that category, as with the product hierarchy 42 of FIG. 1. Unlike the embodiment of FIGS. 1-5, the ads generally do not need to be related to any particular product or product category.

As a web site operator browses the hierarchy of topical advertisement categories 142, the user interface may provide an option to view some or all of the currently-posted advertisements associated with each such category. Thus, before selecting a particular category of ads to host, the web site operator can obtain a general sense of the types of ads that will be displayed. The user interface may also provide an option for the web site operator to exclude specific ads or advertisers within a selected advertisement category. An option may also be provided for the web site operator to subscribe to a notification service that notifies web site operators when new ads are added to the advertisement categories they have selected to host.

The topical ad categories may also include attributes reflective of the target audience. For instance, in the case of products, the topical ad category "products/auto parts/wholesale auto parts" (where "wholesale auto parts" is the lowest level category) may be provided in the hierarchy 142 to accommodate ads for wholesale sellers of auto parts. An operator of a web site frequently visited by auto parts distributors may wish to host ads in this category to provide ads that are helpful to its uses.

The embodiment depicted in FIG. 6 may otherwise operate as described above for FIGS. 1-5, but with the product and product category descriptors replaced with advertisement category descriptors. For instance, a web site operator may select a particular advertisement category from the hierarchy 142, and then be provided with HTML or other coding to add to those web pages on which the ads are to be displayed (see FIG. 4). In addition, pages of the ad-hosting web site 38 may be analyzed to match such pages with the topical advertisement categories with which they most closely correspond.

As will be apparent, the embodiments of FIGS. 1 and 6 may be appropriately combined to provide a system that includes both a browsable hierarchy of product categories and a browsable hierarchy of more generalized topical advertisement categories. In addition, hierarchies of other types of items with which ads may be associated may be provided In both of the embodiments described above, ads may advantageously be matched to web pages without requiring the advertiser to purchase or bid on keywords or keyword phrases. In some embodiments, however, the system may allow advertisers to bid on keywords and keyword phrases to provide an additional mechanism for matching ads to web pages.

Although this invention has been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is intended to be defined only by reference to the appended claims

What is claimed is:

1. An ad server system, comprising:
a database that stores ads for providers of product-related services such that at least some of the ads are stored in association with a corresponding product descriptor that describes one or more products to which the respective ad corresponds, the product descriptors being separate from the ads, wherein at least some of the ads are additionally stored within the database in association with ad category descriptors that specify types of product-related services to which such ads correspond; and
an ad server comprising computer hardware, the ad server operative to:
use the associations between the ads and the product descriptors to select ads from the database, the ads being limited to ads for product-related services associated with a product,
use the ad category descriptors to filter out ads falling outside a pre-selected set of service categories for a given web page, and
output the ads for display on one or more web pages related to the product.

2. The system of claim 1, wherein each product descriptor corresponds to a particular node of a browsable product hierarchy in which products are arranged by category.

3. The system of claim 1, wherein the ad server selects ads at least in part by analyzing the one or more web pages to identify a product or product category to which the one or more web pages correspond.

4. The system of claim 3, wherein the ad server selects ads based at least in part on product information embedded within ad request coding of the one or more web pages.

5. The system of claim 1, further comprising an ad generation application that provides a user interface and associated functionality for a provider of a product-related service to generate an ad for the product-related service, and to associate the ad with a product descriptor by selecting a desired product or product category from a browsable product hierarchy in which products are arranged within multiple levels of product categories.

6. The system of claim 5, wherein the ad generation application further provides a user interface and associated functionality for the provider of the product-related service to assign the ad to one of a preexisting set of ad categories associated with the selected product or product category, said ad categories including categories of product-related services.

7. The system of claim 1, further comprising an ad hosting application that provides functionality for a web site operator to select types of ads to host on a selected web page by selecting a product or product category from a browsable product hierarchy, and by selecting from a corresponding set of ad categories associated with the selected product or product category, said ad categories including categories of product-related services.

8. The system of claim 1, wherein the database additionally stores ads for products, and the ad server inhibits an ad for a first product from being displayed on a web page that describes the first product.

9. An ad server system, comprising:
a database that stores ads for providers of product-related services such that at least some of the ads are stored in association with a corresponding product descriptor that describes one or more products to which the respective ad corresponds, the product descriptors being separate from the ads; and
an ad server comprising computer hardware, the ad server operative to:
use the associations between the ads and the product descriptors to select ads from the database, the ads being limited to ads for product-related services associated with a product, wherein the ad server selects ads at least in part by analyzing one or more web pages to identify a product or product category to which the one or more web pages correspond, and wherein the ad server selects ads based at least in part on product information embedded within ad request coding of the one or more web pages, and
output the ads for display on one or more web pages related to the product.

10. The system of claim 9, wherein each product descriptor corresponds to a particular node of a browsable product hierarchy in which products are arranged by category.

11. The system of claim 9, wherein at least some of the ads are additionally stored within the database in association with ad category descriptors that specify types of product-related services to which such ads correspond, wherein the ad server uses the ad category descriptors to filter out ads falling outside a pre-selected set of service categories for a given web page.

12. The system of claim 9, further comprising an ad generation application that provides a user interface and associated functionality for a provider of a product-related service to generate an ad for the product-related service, and to associate the ad with a product descriptor by selecting a desired product or product category from a browsable product hierarchy in which products are arranged within multiple levels of product categories.

13. The system of claim 12, wherein the ad generation application further provides a user interface and associated functionality for the provider of the product-related service to assign the ad to one of a preexisting set of ad categories associated with the selected product or product category, said ad categories including categories of product-related services.

14. The system of claim 9, further comprising an ad hosting application that provides functionality for a web site operator to select types of ads to host on a selected web page by selecting a product or product category from a browsable product hierarchy, and by selecting from a corresponding set of ad categories associated with the selected product or product category, said ad categories including categories of product-related services.

15. The system of claim 9, wherein the database additionally stores ads for products, and the ad server inhibits an ad for a first product from being displayed on a web page that describes the first product.

\* \* \* \* \*